E. N. PAINE.
FLOATING FISH TRAP.
APPLICATION FILED JAN. 7, 1915.
1,157,417.
Patented Oct. 19, 1915.
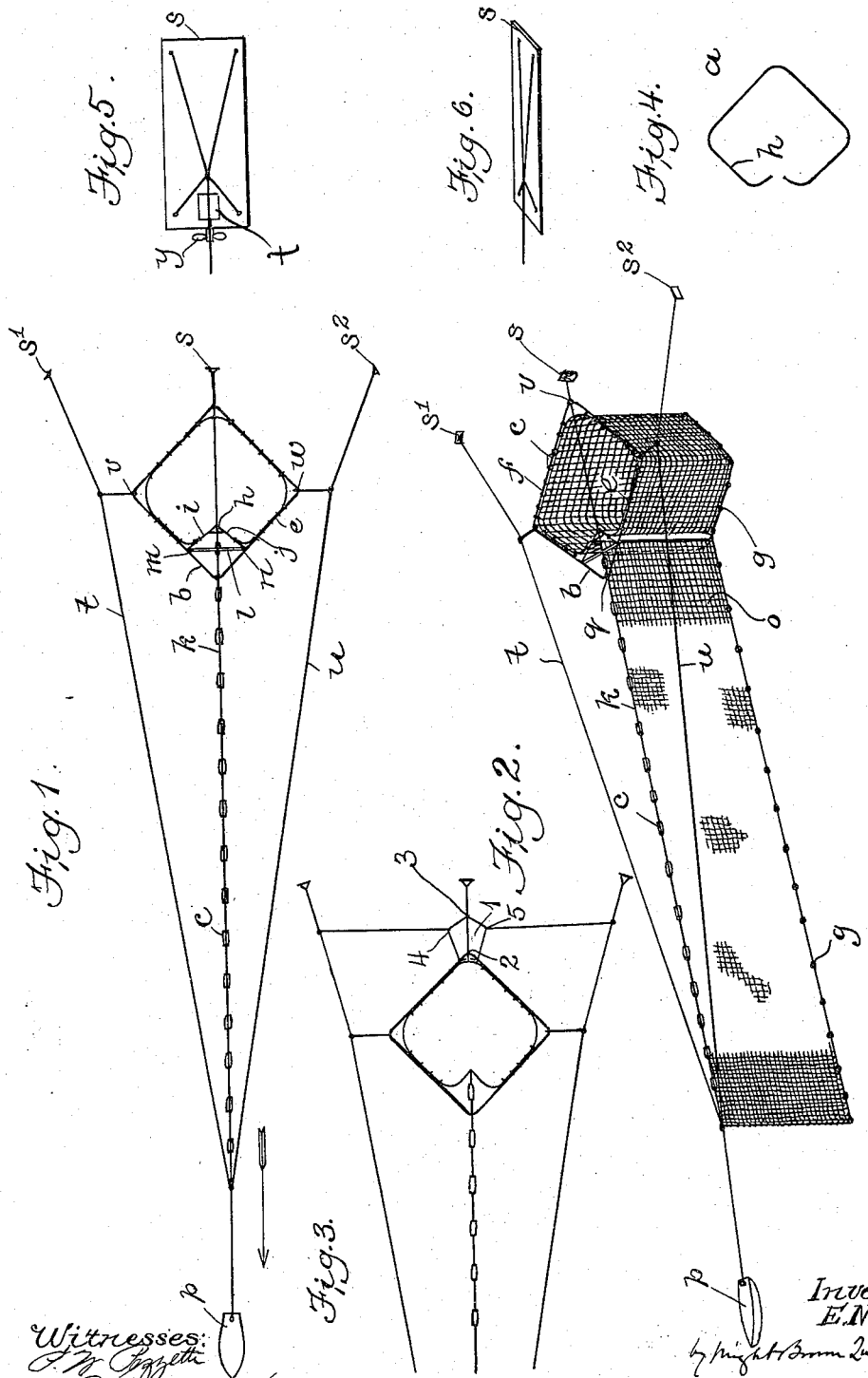

ically are old or for
UNITED STATES PATENT OFFICE.

EDWIN N. PAINE, OF PROVINCETOWN, MASSACHUSETTS.

FLOATING FISH-TRAP.

1,157,417.  Specification of Letters Patent.  Patented Oct. 19, 1915.

Application filed January 7, 1915.  Serial No. 939.

*To all whom it may concern:*

Be it known that I, EDWIN N. PAINE, a citizen of the United States, and resident of Provincetown, in the county of Barnstable and State of Massachusetts, have invented certain new and useful Improvements in Floating Fish-Traps, of which the following is a specification.

The object of the present invention is to provide a trap for catching fish, which may be used in deep water and be supported by floats on the surface of the water, and to provide in connection with such a trap means for holding the trap in a spread open condition by reaction of the water when the trap is towed, or by pressure of the water in a stream or tideway.

In the accompanying drawings I have shown a device in which my invention is embodied, illustrating particularly those features which constitute the essential combination in which my invention is involved, but not going into detail with respect to features which individually are old or for which other constructions may be substituted.

Figure 1 of the drawings shows a plan view of a net embodying my invention attached to a boat for towing. Fig. 2 is a perspective view of the same. Fig. 3 is a plan view of the trap modified by the addition of a further element which is not shown in Figs. 1 and 2. Fig. 4 is a plan view of the trap proper separated from the remainder of the device. Figs. 5 and 6 are respectively an elevation and a perspective view of one of the drag members which are employed for holding the trap distended.

The same reference characters indicate the same parts in all the figures.

Referring first to Figs. 1 and 2 $a$ represents a trap which is made of netting suspended from a frame formed of members $b$, $c$, $d$, and $e$, such members being preferably ropes. This frame is provided with floats $f$ whereby it is enabled to remain on the surface of the water, and the bottom of the net is provided with weights $g$ which cause the net to assume a perpendicular or approximately perpendicular position when left free in the water. One side of the trap is provided with an opening or gate $h$ through which the fish may enter, the portions of the net which form the boundaries of such opening being attached to and supported by lines, or other spreading members, $i$ and $j$ which are connected to the members $b$ and $e$ and also to a central tow line $k$. A spreader $l$ is provided between the points $m$ and $n$ at which the members $i$ and $h$ are connected to the members $b$ and $e$, respectively. The trap $a$ shown in the drawing is one wherein the fish are trapped and retained until dipped or otherwise removed therefrom. There are many types of such traps, and as will be obvious this invention is not restricted to any particular type of trap. The tow line $k$ or anchor line is also buoyed up by floats $c$ and it supports the upper edge of a net $o$, which is weighted by sinkers $g$ at its lower edge so as to assume a vertical position when released in the water and form what may be called for the purposes of this description a wall. Such net wall extends to and possibly through the gate $h$ of the trap and is so placed as to leave spaces between itself and each boundary of the gate. The tow line $k$ is made fast to a tow boat $p$, by which the entire trap is drawn through the water at any desired rate of speed. Said tow line also extends through the frame $b$, $c$, $d$, and $e$ is made fast to such frame at diagonally opposite points $q$ and $r$, and to its outer end is made fast a drag $s$. Said drag is preferably a board or plate sufficiently buoyant to float, but so weighted at one edge as to float in a vertical plane, and being so connected to the tow line that its plane is directly across the line. The drag $s$ thereby keeps the line $k$ in a taut condition and causes the diagonally opposite points $q$ and $r$ of the trap frame to be held as far apart as permitted by the tow line. Means are also provided for distending the trap laterally, such means comprising drag members $s'$ and $s^2$, which may be of the same general character and construction as the drag $s$, but are connected to their respective tow lines $t$ and $u$ at a forward and outward inclination to the direction in which the trap is towed. The tow lines $t$ and $u$ are connected to the line $k$ as shown and are also connected either directly or indirectly to the intermediate diagonally opposite points $v$ and $w$ of the frame from which the trap is hung. Thus as the trap is towed in the direction of the arrow, shown in Fig. 1, the drag $s$ spreads out the trap in a longitudinal direction and the inclined drags $s'$ and $s^2$ spread out the trap laterally. The tow line is, of course, kept taut and the net $o$ is thereby maintained as a vertical and substantially flat and straight wall.

The function of the members $s'$ and $s^2$ is to act as spreaders to distend the trap by the action or reaction of the water. This action may be assisted by providing the spreaders with automatic motors and propellers, such a motor being indicated at $x$ and the propeller at $y$ in Fig. 5. The motor may be a spring motor, or of any other suitable character, capable of storing enough power to run for the desired length of time and the propeller operated thereby will assist the action of the water in causing the spreaders to move apart when the speed of the trap is less than would be necessary thus to operate the spreaders by the reaction of the water alone.

Fig. 3 illustrates substantially the same device as hereinbefore described with the exception that in the rear of the trap $a$ there is connected a pocket 1 of small volume, between the forward end of which and the rear of the trap is a gateway 2. The same tow lines and the drag and spreader members attached thereto are provided as before, the rear corner of the pocket 1 being connected to the central tow line $k$ at the point 3 and the side corners 4 and 5 being connected with the lateral tow lines by connecting ropes as shown. Thereby the spreaders and drag act to hold the pocket as well as the trap in distended position.

The principle on which this trap operates is the well known fact that when fish encounter an obstruction such as a net or anything else they will turn and swim along the obstruction at the same level trying to find the end and will not attempt to dive under it. Consequently when the fish in swimming encounter the vertical net wall $o$ they will turn and swim along the wall in one direction or the other, and those which turn toward the trap will pass through the gate $h$ into the trap, in which they swim along the walls seeking an outlet and are turned back by the inwardly bent walls at each side of the gate. This peculiarity of fish enables the trap to be used as a floating trap providing the net structures hang deeply enough to intercept the fish, since it is not necessary that the strap extend to the ground beneath the water.

I am aware that traps designed to take advantage of the above described peculiarity of fish have heretofore been used, but so far as I am aware such traps have been held in their proper positions and outlines either by stakes driven into the bottom, in the shallow water, or by a system of anchors and floats arranged on all sides of the trap and connected to the various parts thereof when used in deeper water. Never so far as I know has a floating trap equipped with spreaders and a drag for distending the trap been used. It is, of course, to be understood that the trap may also be anchored in a current, in which case the flow of the water will have the described effect in distending the trap, without requiring the trap to be towed. I believe that my combination above described is new and of advantage in enabling a trap of the sort described to be used in water which is too deep to permit of the trap being staked to the bottom or anchored, and which also may be moved from place to place wherever the fish may be found.

What I claim and desire to secure by Letters Patent is:

1. A floating fish trap comprising a chamber of netting, a flexible floating frame supporting the upper edge of such chamber central tow line connected to diagonally opposite points of said frame in extending forwardly therefrom, a drag connected to the tow line in rear of said frame, whereby to spread open the frame work longitudinally, and tow lines on each side of the trap connected to the intermediate diagonally opposite corners, and spreader members connected to the lateral tow lines and constructed to apply force outwardly, whereby to distend the frame work laterally.

2. A floating fish trap comprising a line adapted to float on the surface of water, a net wall suspended by one edge from said line and weighted at the opposite edge so as to hang vertically, a trap formed as a chamber of netting having a gate at one side adjacent to the rear end of the said wall, a flexible floating frame from which the net forming the chamber is suspended, said frame being connected at longitudinally separated points to the said line, side tow lines connected to intermediate points of the frame work, a drag connected to the central tow line and outwardly inclined drag members or spreaders connected to the side lines and caused by the pressure of the water when the trap is drawn through the water to exert force tending to spread the chamber frame work open laterally.

3. In a trap of the sort described, a net chamber, a flexible buoyant frame from which said chamber is suspended, a tow line connected to said frame at longitudinally separated points, a floating drag attached to said line in rear of the frame, a second line having a connection with the frame at a point intermediate the points of connection thereof with the first line, and a floating motor connected to the second line and arranged to apply force thereto tending to separate the second line from the first line.

In testimony whereof I have affixed my signature, in presence of two witnesses.

EDWIN N. PAINE.

Witnesses:
WALTER H. ADAMS,
INA M. SMALL.

Copies of this patent may be obtained for five cents each, by addressing the "Commissioner of Patents, Washington, D. C."